US010108566B2

(12) United States Patent
Kim

(10) Patent No.: US 10,108,566 B2
(45) Date of Patent: Oct. 23, 2018

(54) APPARATUS AND METHOD FOR VIRTUALIZING NETWORK INTERFACE

(71) Applicant: GURUMNETWORKS, INC., Yongin-si, Gyeonggi-do (KR)

(72) Inventor: Sung Min Kim, Yongin-si (KR)

(73) Assignee: GURUMNETWORKS, INC., Yongin-shi (KR)

( * ) Notice: Subject to any disclaimer, the term of this patent is extended or adjusted under 35 U.S.C. 154(b) by 223 days.

(21) Appl. No.: 15/108,229

(22) PCT Filed: Dec. 30, 2014

(86) PCT No.: PCT/KR2014/013042
§ 371 (c)(1),
(2) Date: Jun. 24, 2016

(87) PCT Pub. No.: WO2015/102372
PCT Pub. Date: Jul. 9, 2015

(65) Prior Publication Data
US 2016/0328342 A1    Nov. 10, 2016

(30) Foreign Application Priority Data
Jan. 6, 2014  (KR) ........................ 10-2014-0001033

(51) Int. Cl.
G06F 13/36 (2006.01)
G06F 15/167 (2006.01)
G06F 13/28 (2006.01)
G06F 9/455 (2018.01)
G06F 13/42 (2006.01)

(52) U.S. Cl.
CPC .......... *G06F 13/28* (2013.01); *G06F 9/45533* (2013.01); *G06F 9/45558* (2013.01); *G06F 13/4221* (2013.01); *G06F 2009/45595* (2013.01)

(58) Field of Classification Search
None
See application file for complete search history.

(56) References Cited

U.S. PATENT DOCUMENTS

2006/0288129 A1* 12/2006 Pope ....................... G06F 13/28
710/22
2012/0207156 A1* 8/2012 Srinivasan ............. H04L 12/56
370/389
2014/0201305 A1* 7/2014 Dalal ..................... G06F 13/16
709/212

FOREIGN PATENT DOCUMENTS

EP         2466476 A1    6/2012
JP      2013-038715 A    2/2013
KR   10-2013-0060563 A  6/2013
KR   10-2013-0067906 A  6/2013

* cited by examiner

*Primary Examiner* — Hyun Nam
(74) *Attorney, Agent, or Firm* — AEON Law, PLLC; Adam L. K. Philipp; David V. H. Cohen

(57) ABSTRACT

A device for virtualizing a network interface includes, a virtualization information unit configured to store virtual network interface card (NIC) information for implementation of a plurality of predetermined virtual NICs on the memory of the computer, and a controller configured to output the control signal for controlling the I/O buffer unit, the I/O unit, the DMA I/O unit and the virtualization information unit based on the storage notification signal and the NIC virtualization information. Accordingly, multiple virtual NICs may be created using one physical NIC.

18 Claims, 7 Drawing Sheets

APPARATUS AND METHOD FOR VIRTUALIZING NETWORK INTERFACE

CROSS-REFERENCE TO RELATED APPLICATIONS

This application claims the priority of Korean Patent Application No. 10-2014-0001033 filed on Jan. 6, 2014, in the Korean Intellectual Property Office, the disclosure of which is incorporated herein by reference.

BACKGROUND

Technical Field

The present disclosure relates to a device and a method for virtualizing a network interface. More specifically, the present disclosure relates to a device and a method for virtualizing a network interface using a network interface card (NIC).

Description of the Related Art

In the field of virtualization technology, host virtualization technology has evolved drastically in recent years and is about to being completed technically. However, it is very difficult to implement network virtualization because most functions of network devices depend on hardware (H/W). Moreover, if the virtualization function is implemented in software (S/W), performance of the virtualized network devices may be degraded such that packet data cannot be transferred at high speed.

Korean Patent No. 10-1232211, Korean Patent No. 10-1275293, and Korean Patent Application Publication No. 10-2011-0046240 disclose virtualization of network devices. However, these documents focus on the structure of devices for supporting a virtual network.

SUMMARY

In view of the above, an object of the present disclosure is to provide a device and a method for virtualizing a network interface which implement a plurality of virtual network interface cards by virtualizing one physical network interface card.

According to an aspect of the present disclosure, there is provided a device for virtualizing a network interface, the device including an input/output (I/O) buffer unit configured to temporarily store packet data, an I/O unit configured to transmit the packet data between a network and the I/O buffer unit and to generate and output a storage notification signal when the packet data from the network is stored in the I/O buffer unit, a DMA I/O unit configured to transmit the packet data between the I/O buffer unit and a memory of a computer in response to a control signal, a virtualization information unit configured to store virtual network interface card (NIC) information for implementation of a plurality of predetermined virtual NICs on the memory of the computer, and a controller configured to output the control signal for controlling the I/O buffer unit, the I/O unit, the DMA I/O unit and the virtualization information unit based on the storage notification signal and the NIC virtualization information.

According to an aspect of the present disclosure, there is provided a method for virtualizing a network interface, the method including: generating, by a CPU of a computer, virtual network interface card (NIC) information on a memory of an NIC; inputting, by a single input/output (I/O) buffer unit under the control of a controller of the NIC, packet data to a plurality of predetermined virtual NICs on a memory of the computer based on the virtual NIC information; outputting, by the virtual NICs, the packet data to the network and updating output bandwidth information of the virtual NICs; and deleting, by the CPU of the computer, the virtual NIC information generated on the memory of the NIC.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

The exemplary embodiments described below are implemented by combining elements and features of the present disclosure in various ways. The elements or features may be considered as being optional unless explicitly stated otherwise. The elements or features may be practiced without being combined with other elements or features. In addition, some elements and/or features may be combined to implement exemplary embodiments of the present disclosure. The order of operations may be altered in various other embodiments. Some elements or features of an exemplary embodiment may be included in another exemplary embodiment or may be replaced with counterparts of another exemplary embodiment.

Exemplary embodiments of the present disclosure may be implemented by various means. For example, the exemplary embodiments of the present disclosure may be implemented with firmware, software, or a combination thereof.

In the implementation in the hardware, a method according to exemplary embodiments of the present disclosure may be implemented by application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the implementation in firmware or software, a method according to exemplary embodiments of the present disclosure may be implemented as modules, procedures, functions or the like that perform functions or operations described above. Software codes may be stored in a memory unit and may be executed by a processor. The memory unit may be disposed inside or outside the processor and may transmit/receive data to/from various means kwon in the art.

As used herein, a phrases "an element A connected to an element B" refers to that the element A may be directly connected to the element B, as well as that another element C may be interposed between the element A and the element B and the element A is electrically connected to the element B via another element C. It is to be noticed that the term "comprising", used in the present description and claims, should not be interpreted as being restricted to the means listed thereafter; it does not exclude other elements or steps.

As used herein, the term "module" means a unit component for performing at least one function or operation and may be implemented in hardware or software or as a combination of hardware and software.

The terms used herein, including technical terms, have the same meanings as terms that are generally understood by those skilled in the art, as long as the terms are not explicitly defined differently. It should be understood that terms defined in a commonly used dictionary have meanings coinciding with those of terms in the related technology. As long as the terms are not defined obviously, they are not ideally or excessively analyzed as formal meanings.

Figure 1:
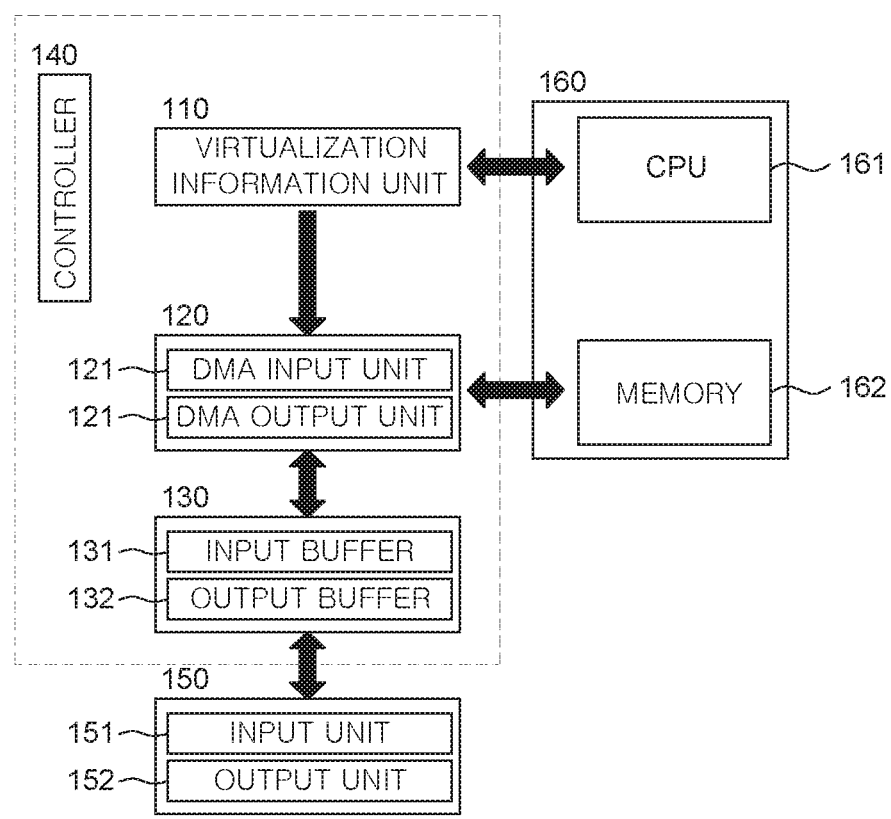
FIG. 1 is a block diagram of a device for virtualizing a network interface according to an exemplary embodiment of the present disclosure.
Figure 2:
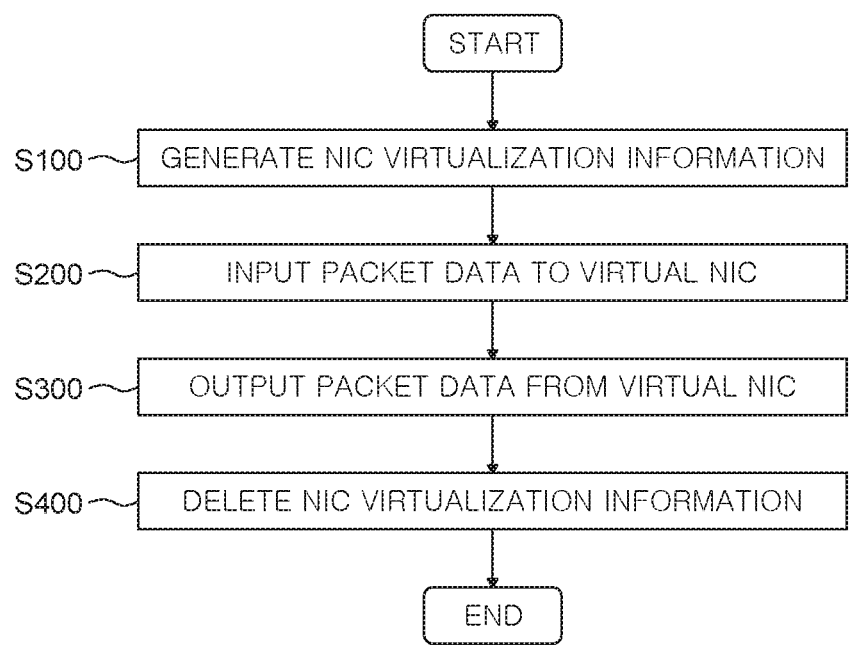
FIGS. 2 to 4 are flowcharts for illustrating a method for virtualizing a network interface according to an exemplary embodiment of the present disclosure.
Figure 3:
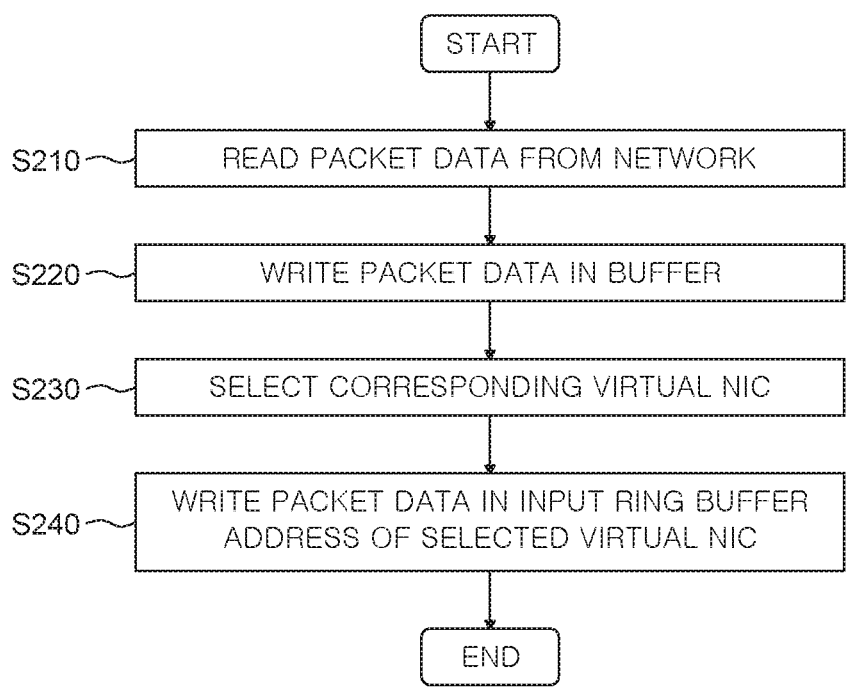
Figure 4:
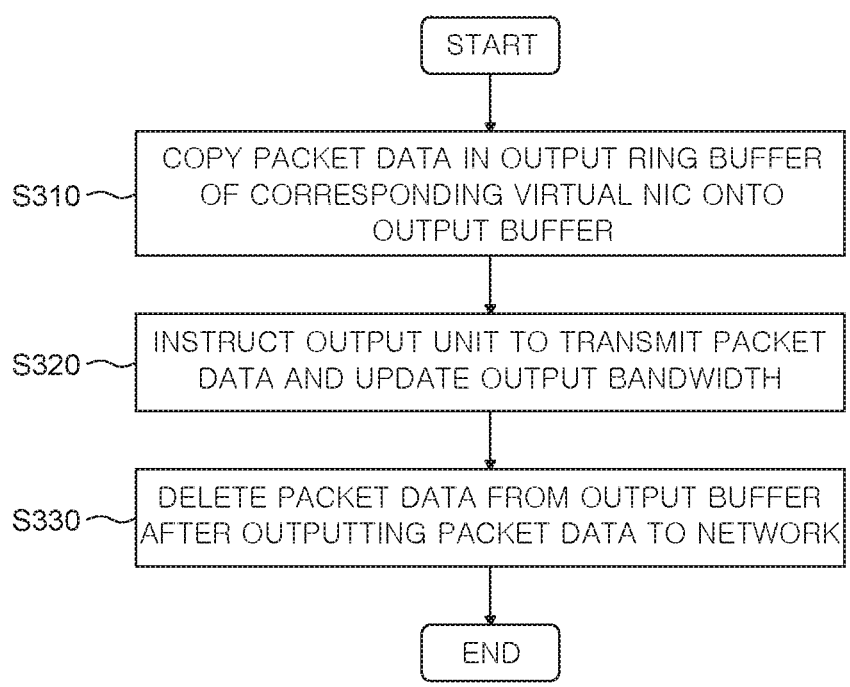

FIG. 1 is a block diagram of a device for virtualizing a network interface according to an exemplary embodiment of the present disclosure. FIGS. 2 to 4 are flowcharts for illustrating a method for virtualizing a network interface according to an exemplary embodiment of the present disclosure.

Referring to FIGS. 1 to 4, a device for virtualizing an network Interface according to an embodiment of the present disclosure includes a controller 140, a virtualization information unit 110, a DMA input/output (I/O) unit 120 including a DMA input unit 121 and a DMA output unit 122, an I/O buffer unit 130 including an input buffer 131 and an output buffer 132, and an I/O unit 150 including an input unit 151 and an output unit 152. Preferably, the I/O buffer unit 130 has one input buffer 131 and one output buffer 132.

A computer 160 where the virtualization device is to be installed or operatively connected includes a CPU 161 and a memory 162. A plurality of virtual network interface cards (NICs) is configured in the memory 162 in advance.

The virtualization information unit 110 stores NIC virtualization information including MAC addresses or VLAN information of the virtual NICs, a list of addresses of input ring buffers, an I/O bandwidth, a list of MAC addresses available, and NIC status information. The virtualization information unit may be implemented as a memory installed in an NIC.

The input unit 151 receives packet data from a network, writes the packet data into the input buffer 131, generates a storage notification signal and outputs the storage notification signal to the controller 140. The input buffer 131 temporarily stores multiple packet data transmitted from the input unit 151. The DMA input unit 121 transmits the packet data in the input buffer 131 to the memory 162 of the computer based on the information in the virtualization information unit 110.

The DMA output unit 122 copies the packet data in the memory 162 onto the output buffer 132 based on the information in the virtualization information unit 110, and the output buffer 132 temporarily stores the packet data such that the output unit 152 outputs the packet data. The output unit 152 transmits the packet data in the output buffer 132 to the network.

The controller 140 outputs a control signal for controlling the virtualization information unit 110, the DMA I/O unit 121 and 122, the I/O buffer unit 131 and 132, and the I/O unit 151 and 152, based on the storage notification signal and the NIC virtualization information.

Generating NIC Virtualization Information (S100)

The CPU 161 inputs, by the controller 140, NIC information including MAC addresses or VLAN information of the virtual NICs, the list of addresses of input ring buffers, the I/O bandwidth, the list of available MAC addresses, and the NIC status information to the virtualization information unit 110 (S100).

Inputting Packet Data (S200)

The input unit 131 reads packet data from the network, writes the packet data into the input buffer 121, and notifies the controller 140 of the same (S210 and S220). The controller 140 selects a virtual NIC based on the destination MAC or VLAN information of the packet data in the input buffer 121 and the information in the virtualization information unit 110, and obtains an input ring buffer address of the selected virtual NIC. If the destination MAC is MAC multicast destination, the controller 140 selects a virtual NIC having a predetermined MAC address or predetermined VLAN ID (S230). For example, the predetermined MAC address may be ff:ff:ff:ff:ff:ff, and the predetermined VLAN ID may be 4095.

When there is no empty packet ring buffer address, the controller 140 discards the packet data. In addition, the controller 140 discards the packet data when there is no virtual NIC corresponding to the destination MAC or VLAN information. In addition, the controller 140 discards the packet data if the bandwidth of the packet data exceeds the allocated input bandwidth of a virtual NIC. In addition, the controller 140 discards the packet data when the MAC address contained in the packet data is not in the list of available MAC addresses of the virtual NIC.

The controller 140 writes packet data into the input ring buffer address of a virtual NIC by the DMA output unit 122, deletes the packet data from the input buffer unit, and updates the input bandwidth information of the virtual NIC (S240).

Outputting Packet Data (S300)

The controller 140 executes the following procedure for all virtual NICs when the bandwidths of the virtual NICs are sufficiently large.

The controller 140 controls the DMA output unit 122 so that it copies the packet data from the output ring buffer onto the output buffer 132 (S310) and transmits, to the CPU 160, information indicating that the packet data has been transferred (S320). If the destination MAC of the packet data is not in the list of available MAC addresses, the controller 140 discards the packet data.

The controller 140 instructs the output unit 152 to output the packet data and updates the bandwidth information of the virtual NIC. After outputting the packet data in the output buffer 132 to the network, the output unit 152 deletes the packet data from the output buffer 132 (S330).

Deleting NIC Virtualization Information (S400)

The CPU 161 deletes the NIC virtualization information generated by the virtualization information unit 110.

According to an exemplary embodiment of the present disclosure, a memory space having a special structure is allocated to the memory 162 of the computer in order to utilize the space and structure as virtual NICs. In order to utilize the space and structure as multiple virtual NICs, different MAC addresses are assigned to the space allocated as the virtual NIC space, so that the space can be divided into multiple virtual NICs.

Further, according to an exemplary embodiment of the present disclosure, space information on the virtual NICs may be configured in the Peripheral Component Interconnect (PCI) in advance which supports the virtual NICs such that the Direct Memory Access (DMA) function can be used between the PCI and the memory of the computer. By using DMA function, packet data can be immediately written when the packet data is arrived. As a result, the transfer rate can be enhanced.

In addition, according to an exemplary embodiment of the present disclosure, a separate multicast receive (Rx) buffer may be used in the case of multicast packet data, such that the CPU may copy the packet data quickly and a bandwidth may be predetermined in advance such that the Rx buffer and the transmit (Tx) buffer can control the bandwidth. Destination MAC Masking of the packet data may be employed to remove unnecessary packet data, and the computer 160 may create and store packet data in the Rx buffer of a virtual NIC.

According to an exemplary embodiment of the present disclosure, virtual NICs are proposed in such a manner that only one input buffer and one output buffer are used and the virtual network interface information region is separately managed. Packet data may be copied onto the separate region (different virtual NIC regions) based on the destination MAC.

Exemplary embodiments of the present disclosure may be utilized for achieving network virtualization in cloud computing, network virtualization, deep packet inspection, and host virtualization. Multiple virtual NICs may be implemented using a single physical network interface device. In addition, memory copy operation by a computer performed in using the virtual NICs can be reduced, and the network bandwidth can be separated. As a result, the packet data can be stably transferred.

Figure 5:
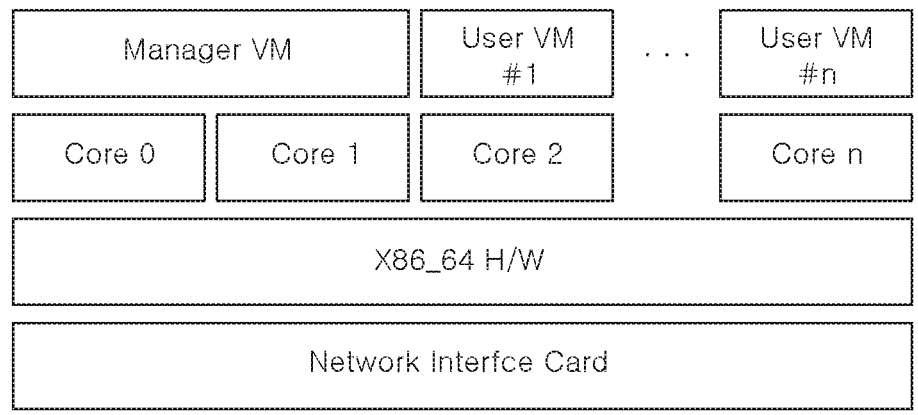
FIG. 5 is a block diagram of a packet engine architecture in which virtualization of a network interface is processed in hardware (H/W)
Figure 6:
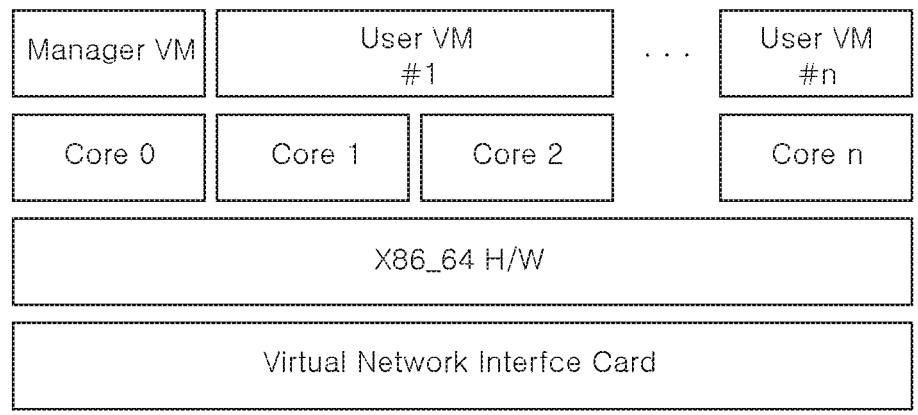
FIG. 6 is a block diagram of a packet engine architecture in which virtualization of a network interface is processed in software (S/W)
Figure 7:
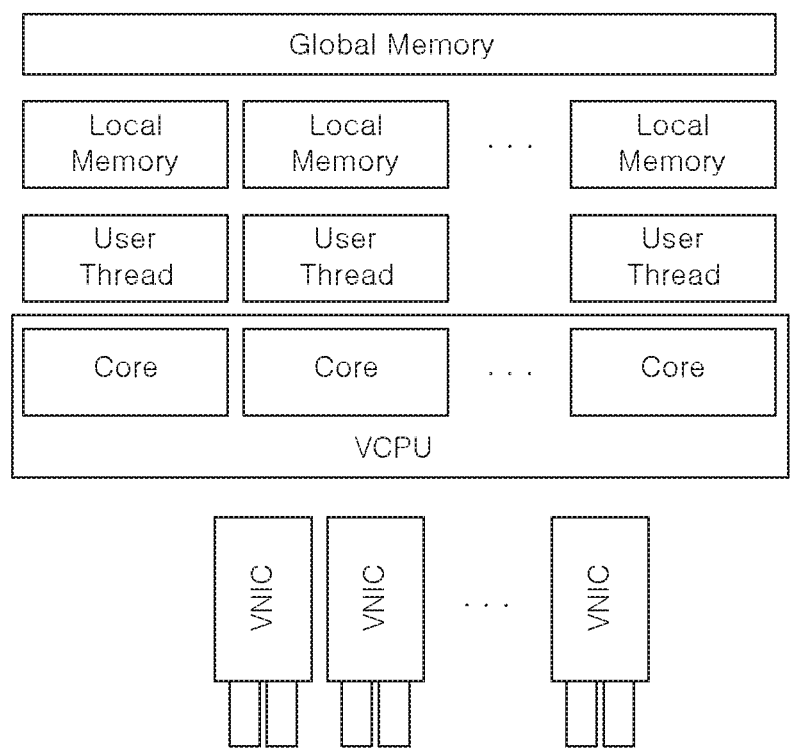
FIG. 7 is a block diagram of a virtual network interface system to which an embodiment of the present disclosure is applied.

FIG. 5 is a block diagram of a packet engine architecture in which virtualization of a network interface is processed in hardware (H/W). FIG. 6 is a block diagram of a packet engine architecture in which virtualization of a network interface is processed in software (S/W). FIG. 7 is a block diagram of a virtual network interface system according to an exemplary embodiment of the present disclosure.

Hereinafter, flows of signals and packet data in the system according to an exemplary embodiment of the present disclosure will be described with reference to FIGS. 5 to 7.

As used herein, a packet engine refers to a deep packet inspection (DPI) engine that supports a virtual network. The packet engine is a real-time operating system (RTOS) based on the x86_64 architecture, which is a H/W architecture used in a personal computer (PC). The packet engine is an operating system (O/S) specialized to drive an S/W router, and it exclusively allocates multiple cores to one S/W router and uses network bandwidth resources separately to enable real-time traffic processing, instead of sharing the core of a CPU by multiple S/W routers. The packet engine allows S/W router developers to directly access packet information of Level 2 (the Ethernet level) using the C language to easily create a DPI application (or S/W router). With the packet engine, a DPI application may be created more easily than with a general-purpose O/S such as LINUX, and multiple S/W routers supporting real-time processing may be driven on one physical H/W component.

Hereinafter, architectures of the packet engine will be described with reference to FIGS. 5 and 6. There are two types of packet engines: type 1 architecture for processing network virtualization in S/W, and type 2 architecture for processing network virtualization in H/W.

FIG. 5 shows type 1 architecture that processes the network virtualization function in S/W by Core 0. As the network virtualization function is processed in S/W, it is possible to use an NIC which does not support the virtualization function, so that a packet engine platform can be implemented at low cost. However, at least one core (e.g., Core 0) is assigned the network virtualization function, and thus a less number of cores can drive a user S/W router.

FIG. 6 shows type 2 architecture to which embodiments of the present disclosure may be applied. In architecture type 2, the network virtualization function depends on H/W, and only minimum functions related to the network virtualization are processed in S/W. In this case, only one core can be assigned the network virtualization, and thus a more number of cores may be assigned the user S/W router. However, an additional H/W component that supports the virtualization is required. Accordingly, a high cost incurs to implement a packet engine platform, compared to type 1 architecture.

FIG. 7 is a block diagram of a packet engine virtual machine to which a method for virtualizing a network interface according to an exemplary embodiment of the present disclosure is applied.

Referring to FIG. 7, a user S/W router operates on a virtual machine (VM) created by a packet engine. One VM includes multiple virtual network interface cards (VNICs), one virtual CPU, and a memory. The virtual CPU (VCPU) includes multiple physical cores, and the S/W router operates on the multiple cores in the form of threads. Each thread has a local memory, and a global memory is shared by all threads.

Figure 8:
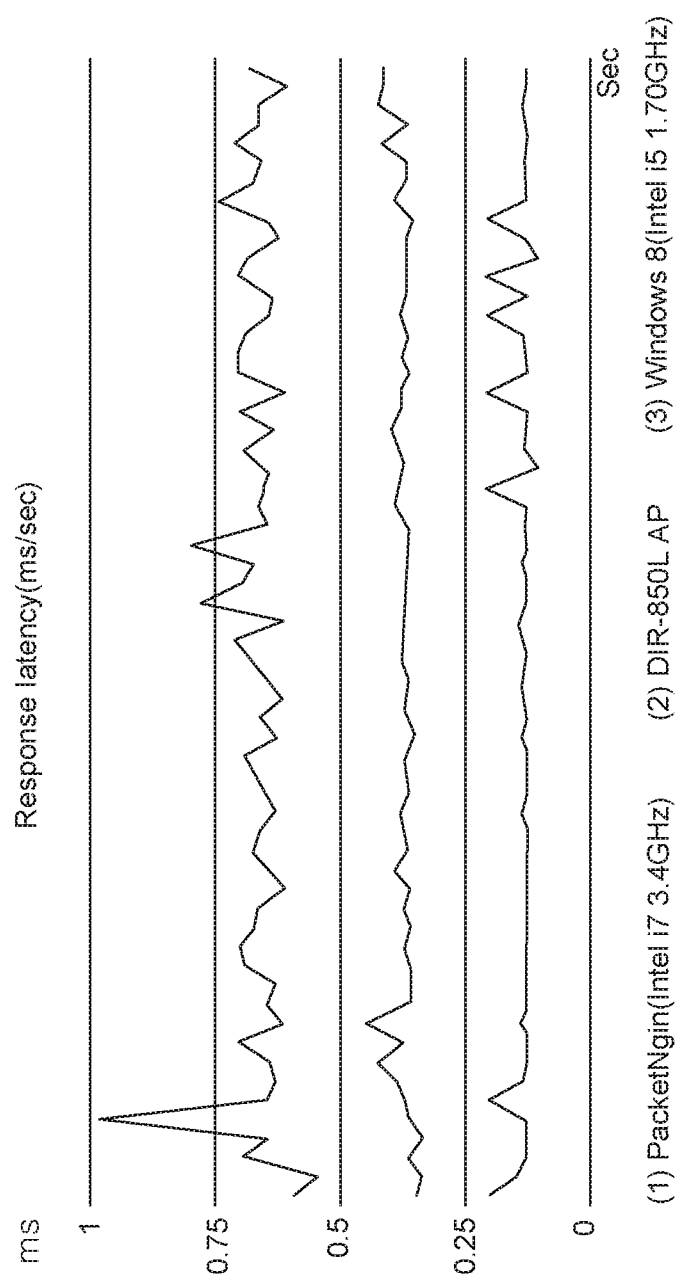
FIG. 8 is a graph for comparing between performance of a method for virtualizing a network interface according to an exemplary embodiment of the present disclosure and performance of an existing method for virtualizing a network interface.

FIG. 8 is a graph for comparing between performance of a method for virtualizing a network interface according to an exemplary embodiment of the present disclosure and performance of an existing method for virtualizing a network interface.

FIG. 8 shows the results of response times to a ping on a packet engine of architecture type 1 operating on Intel Core i7 3.4 GHz, DIR-850L Access Point from D-Link, and Windows 8 operating on Intel Core i5 1.7 GHz. It can be seen from the graph that the response time on the packet engine is 2.7 times shorter than that on DIR-850L Access Point and 4.8 times shorter than that on Windows 8.

As described above, a device for virtualizing network interface and a method thereof according to embodiments of the present disclosure focus on NIC virtualization rather than on the architecture of a virtual network device. The device and method according to embodiments of the present disclosure employ a single I/O buffer as H/W and thus rarely increases the cost for NIC fabrication in that the device and method employ an NIC similar to the existing NIC. That is, the present disclosure is similar to the architecture of an NIC which does not support virtualization, but provides an architecture and method for an NIC supporting virtualization at a low cost by supporting the virtualization function.

Therefore, with a device for virtualizing a network interface and a method thereof according to embodiments of the present disclosure, multiple virtual NICs may be created using one physical network interface device. In using the virtual NICs, copying of the memory of a computer may be minimized, and the network bandwidth may be separated. Thereby, packet data may be stably transferred.

While the present disclosure has been illustrated and described in connection with the embodiments, it will be apparent to those skilled in the art that modifications and variations can be made without departing from the spirit and scope of the present disclosure as defined by the appended claims. Accordingly, the exemplary embodiments described herein are merely illustrative and are not intended to limit the scope of the present disclosure. The technical idea of the present disclosure is not limited by the exemplary embodiments. The scope of protection sought by the present disclosure is defined by the appended claims and all equivalents thereof are construed to be within the true scope of the present disclosure. In addition, a claim may be combined with another claim that is not recited by the claim to thereby contemplate an exemplary embodiment of the present disclosure or add a new claim at the time of submitting an amendment after filing.

What is claimed is:

1. A device for virtualizing a network interface, the device comprising:
    an input/output (I/O) buffer unit configured to temporarily store packet data;
    an I/O unit configured to transmit the packet data between a network and the I/O buffer unit and to generate and output a storage notification signal when the packet data from the network is stored in the I/O buffer unit;
    a DMA I/O unit configured to transmit the packet data between the I/O buffer unit and a memory of a computer in response to a control signal;
    a virtualization information unit configured to store virtual network interface card (NIC) information used for implementing a plurality of predetermined virtual NICs on the memory of the computer; and
    a controller configured to output the control signal for controlling the I/O buffer unit, the I/O unit, the DMA I/O unit and the virtualization information unit based on the storage notification signal and the NIC virtualization information,
    wherein the I/O unit comprises: an input unit configured to receive the packet data from the network and store it in the input buffer unit and to generate the storage notification signal and output it to the controller; and an output unit configured to output the packet data from the output buffer to the network and then delete the packet data, and wherein the DMA I/O unit comprises: a DMA input unit configured to transmit the packet data received from the I/O buffer unit to the memory of the computer, based on the virtualization information; and a DMA output unit configured to transmit the packet data on the memory of the computer to the output buffer.

2. The device of claim 1, wherein the I/O buffer unit comprises:
    an input buffer configured to receive and temporarily store the packet data from the I/O unit; and
    an output buffer configured to temporarily store the packet data to be transmitted to the I/O unit.

3. The device of claim 1, wherein the NIC virtualization information in the virtualization information unit comprises MAC addresses or VLAN information of the virtual NICs, a list of addresses input ring buffers, an I/O bandwidth, a list of available MAC addresses, and NIC status information.

4. The device of claim 3, wherein the controller is further configured to select a virtual NIC according to the destination MAC or VLAN information of the packet data in the input buffer and the NIC virtualization information, and to obtain an input ring buffer address of the selected virtual NIC.

5. The device of claim 4, wherein the controller is further configured to control the DMA I/O unit so that it writes the packet data into the input ring buffer address of the virtual NIC, deletes the packet data from the input buffer, and updates input bandwidth information of the virtual NIC.

6. The device of claim 4, wherein the controller is further configured to select a virtual NIC having a predetermined MAC address or a predetermined VLAN ID when the destination MAC is a MAC multicast destination.

7. The device of claim 4, wherein the controller is further configured to discard the packet data in the input buffer if there is no empty input ring buffer address or no virtual NIC corresponding to the destination MAC or the VLAN information.

8. The device of claim 4, wherein the controller is further configured to discard the packet data in the input buffer if a bandwidth of the packet data exceeds an input bandwidth of the virtual NIC.

9. The device of claim 4, wherein the controller is further configured to discard the packet data in the input buffer if the destination MAC of the packet data is not in the list of available MAC addresses of the virtual NIC.

10. The device of claim 5, wherein, the controller is further configured to control the DMA I/O unit so that it copies the packet data from the output ring buffer of the virtual NIC onto the output buffer, and to transmit information indicating that the packet data has been taken to a CPU of the computer.

11. The device of claim 10, wherein the controller is further configured to instruct the virtual NIC to output the packet data to the I/O unit, and to update output bandwidth information.

12. The device of claim 11, wherein the I/O unit is further configured to output the packet data in the output buffer to the network and then to delete the packet data.

13. A method for virtualizing a network interface, the method comprising:
    generating, by a CPU of a computer, virtual network interface card (NIC) information on a memory of an NIC;
    inputting, by a single input/output (I/O) buffer unit under the control of a controller of the NIC, packet data to a plurality of predetermined virtual NICs on a memory of the computer based on the virtual NIC information;
    outputting, by the virtual NICs, the packet data to the network and updating output bandwidth information of the virtual NICs; and
    deleting, by the CPU of the computer, the virtual NIC information generated on the memory of the NIC,
    wherein the inputting the packet data comprises:
    selecting a virtual NIC based on destination MAC or VLAN information of the packet data and the virtual NIC information and obtaining an input ring buffer address of the selected virtual NIC; and
    writing the packet data in the input ring buffer of the virtual NIC and updating input bandwidth information of the virtual NIC.

14. The method of claim 13, wherein the generating the virtual NIC information comprises:
    generating, by the CPU of the computer, MAC addresses or VLAN information of the virtual NICs, a list of addresses of input ring buffers, an I/O bandwidth, a list of avail MAC addresses, and NIC status information on the memory of the NIC.

15. The method of claim 13, wherein the obtaining the input ring buffer address comprises:
    selecting a virtual NIC having a predetermined MAC address or a predetermined VLAN ID if the destination MAC is a MAC multicast address.

16. The method of claim 13, wherein the obtaining the input ring buffer address comprises:
  discarding the packet data if a bandwidth of the packet data exceeds an input bandwidth of the virtual NIC, or discarding the packet data if the destination MAC of the packet data is not in the list of available MAC addresses of the virtual NIC.

17. The method of claim 13, wherein the updating the output bandwidth information comprises:
  copying, by a DMA output unit of the NIC under the control of the controller, the packet data in the output ring buffers of the virtual NICs onto an output buffer and transmitting information on packet data transmission to the CPU of the computer, and instructing, by the controller, an output unit of the NIC to output the packet data and updating the output bandwidth information of the virtual NICs.

18. The method of claim 17, wherein updating the output bandwidth information comprises, discarding, by the controller, the packet data if the destination MAC of the packet data is not in a list of available MAC addresses of the virtual NIC, and
  wherein the updating the output bandwidth information comprises, discarding, by an output unit of the NIC, the packet data from the output buffer after outputting the packet data to the network.

* * * * *